No. 727,515. PATENTED MAY 5, 1903.
H. B. WATSON & T. C. BILLETOP.
VALVE GEAR FOR FLUID OPERATED MOTORS.
APPLICATION FILED JUNE 27, 1902.
NO MODEL. 3 SHEETS—SHEET 1.
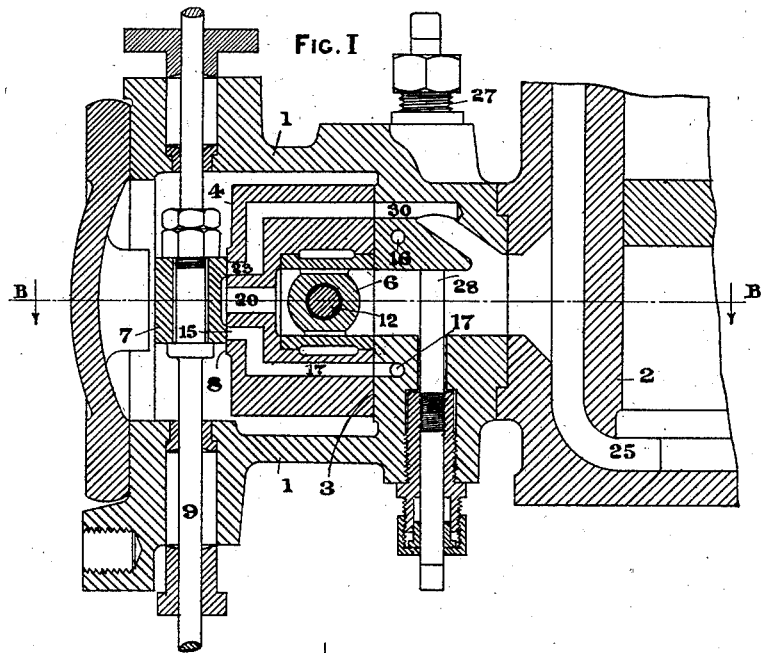
Fig. I
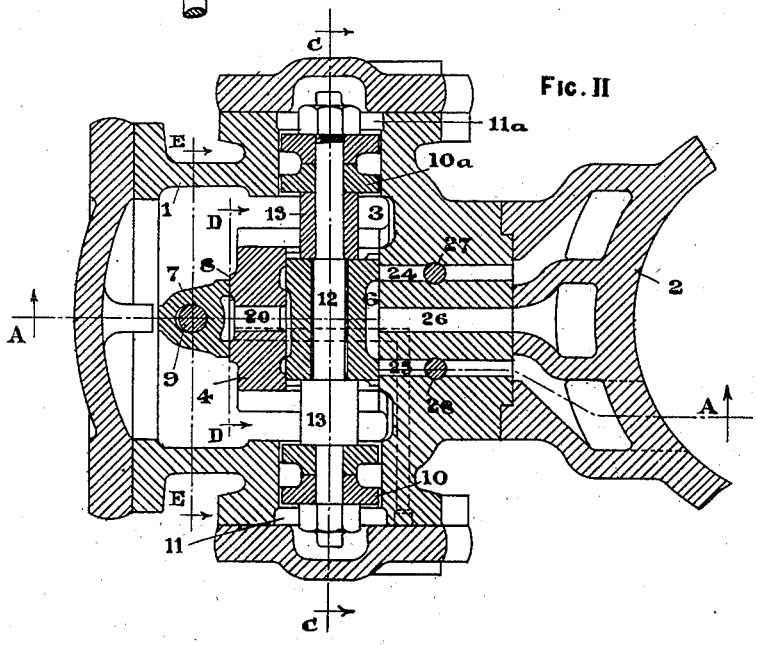
Fig. II
Attest:
C. Middleton
Edw. L. Reed
Inventors,
Henry B. Watson,
Torben C. Billetop,
by — Ellis Spear
Atty.

No. 727,515. PATENTED MAY 5, 1903.
H. B. WATSON & T. C. BILLETOP.
VALVE GEAR FOR FLUID OPERATED MOTORS.
APPLICATION FILED JUNE 27, 1902.
NO MODEL. 3 SHEETS—SHEET 2.
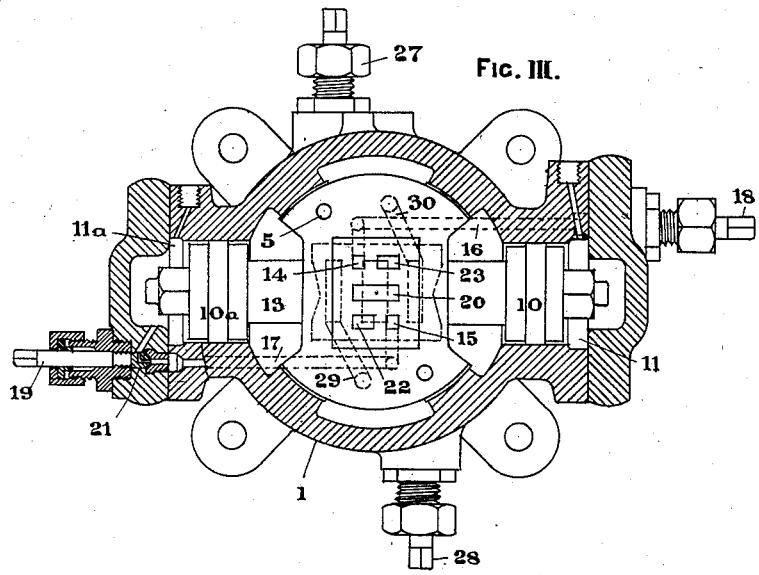
FIG. III.
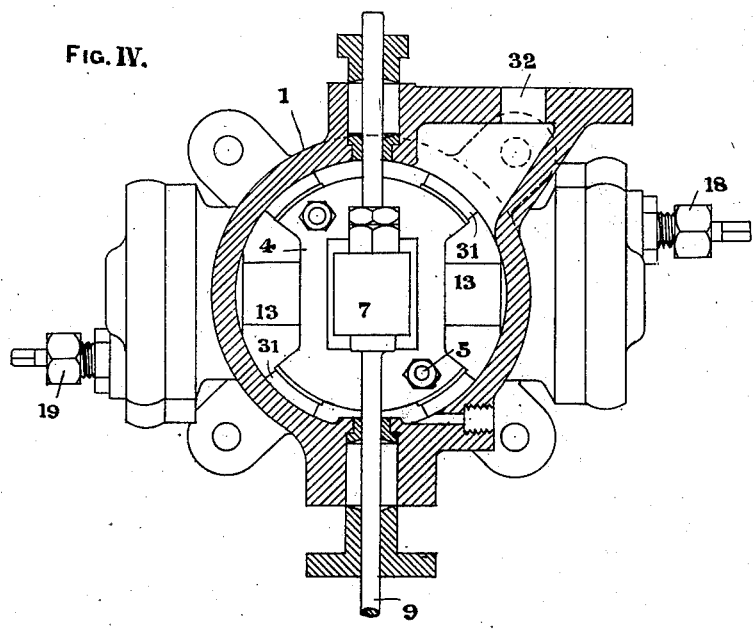
FIG. IV.
Attest:
Inventors.
Henry B. Watson.
Torben C. Billetop.

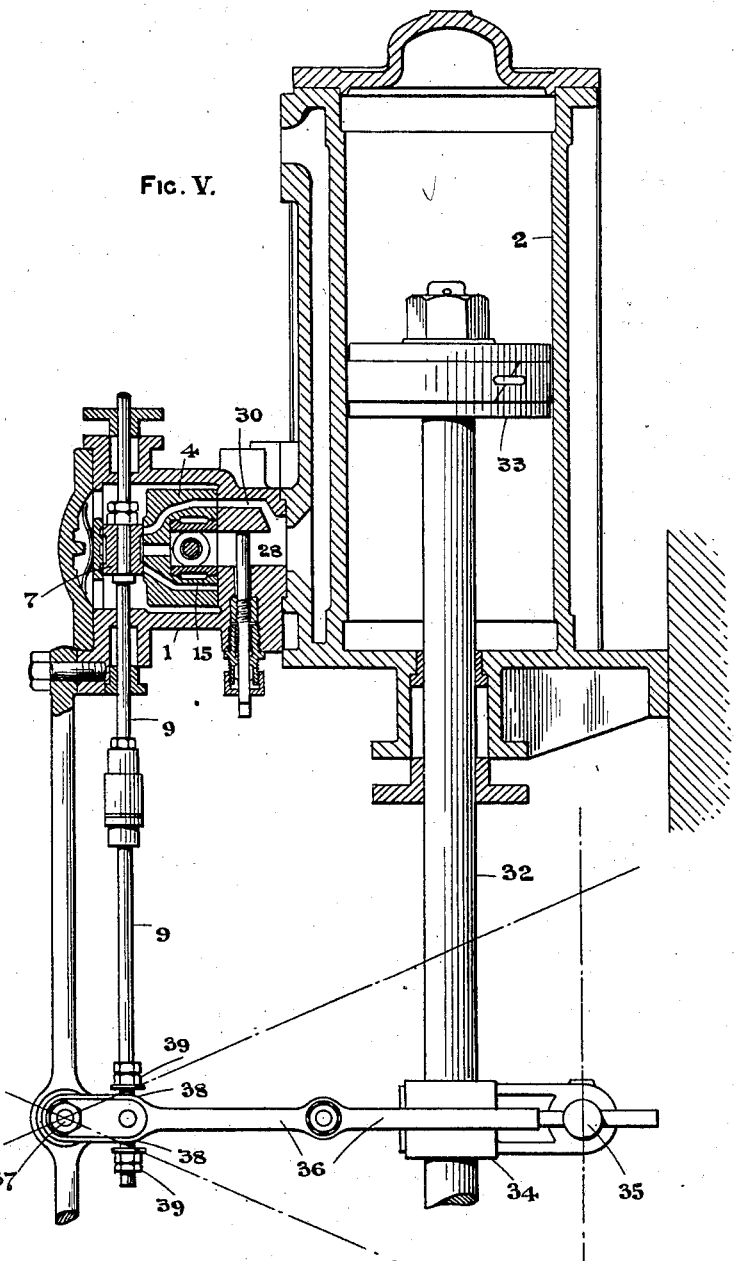

No. 727,515. Patented May 5, 1903.

UNITED STATES PATENT OFFICE.

HENRY BURNETT WATSON AND TORBEN CHRISTIAN BILLETOP, OF NEW-CASTLE-UPON-TYNE, ENGLAND.

VALVE-GEAR FOR FLUID-OPERATED MOTORS.

SPECIFICATION forming part of Letters Patent No. 727,515, dated May 5, 1903.

Application filed June 27, 1902. Serial No. 113,493. (No model.)

*To all whom it may concern:*

Be it known that we, HENRY BURNETT WATSON and TORBEN CHRISTIAN BILLETOP, subjects of the King of Great Britain, residing in Newcastle-upon-Tyne, in the county of Newcastle-upon-Tyne, England, have invented certain new and useful Improvements in Valve-Gear for Fluid-Operated Motors, of which the following is a specification.

This invention has reference to the means for distributing the actuating fluid in fluid-motors, such as those of direct-acting non-rotating steam-pumps, and comprises certain improvements applicable to engines working with high-pressure steam.

We will describe our invention as applied to a vertical single-cylinder steam-pump, which application we have illustrated in the accompanying drawings, in which—

Figure I is a sectional elevation on the line A A of Fig. II of a valve-casing and valves constructed in accordance with this invention. Fig. II is a sectional plan on the line B B of Fig. I. Fig. III is a sectional elevation, to a reduced scale, partly on the line C C and partly on the line D D of Fig. II; and Fig. IV is a sectional elevation on the line E E of Fig. II. Fig. V is a vertical section through the steam-cylinder and valve-chest, showing the gear for actuating the auxiliary valve.

Throughout the drawings the same parts are indicated by the same reference-figures, and in the case of sections the direction in which they are viewed is indicated by the small arrows placed adjacent to the letters denoting the plane of section.

The valve-casing 1 of the steam-cylinder 2 has a vertical port-face 3, to which is fitted a bridle or balance frame 4, which may be bolted down on the port-face 3 with bolts 5, as shown in Fig. III. The valve-casing 1 is provided with two valves moving axially at right angles to each other. The main valve 6 works within the bridle 4 and against the port-face 3, while the auxiliary valve 7 works against the auxiliary port-face 8, formed on the back of the bridle 4. The auxiliary valve 7, which may also be provided with a bridle or balancing frame, is carried in the valve-casing on a balanced spindle 9, and motion is imparted to it by gearing from the main piston-rod. The motion of the main valve 6 is imparted by fluid-pressure, controlled by the auxiliary valve 7, acting on two valve-pistons 10 and $10^a$, working in the valve-cylinders 11 and $11^a$, respectively, communicating alternately with steam and exhaust. These valve-pistons 10 and $10^a$ are mounted on opposite ends of the valve-spindle 12, which passes through and actuates the main valve 6, the latter being held between distance-collars 13.

The ports are arranged as follows:

Dealing in the first place with the auxiliary port-face, 14 and 15 are steam-ports communicating through the passages 16 and 17, respectively, and past the valves 18 and 19, respectively, with the valve-cylinders 11 and $11^a$, respectively.

20 is the exhaust-port, which may be conveniently led through the bridle 4, as shown, so as to communicate with the main-valve exhaust-cavity.

The valves 18 and 19 are adapted to regulate the admission and cushion, and they have the small by-passages 21, preventing the absolute closure of the passages.

In addition to the steam-ports mentioned there is an additional pair 22 and 23, communicating with the main steam-ports, as hereinafter more fully explained.

Dealing now with the main port-face, 24 and 25 are the steam-ports leading, respectively, to the top and bottom ends of the cylinder, and 26 is the ordinary exhaust-port leading to the exhaust branch, which is not shown.

27 and 28 are valves which may be termed "expansion-regulating valves," and which are adapted to vary the effective area of or entirely close the main steam-ports 24 and 25, respectively, in which they are fitted, and so to vary the degree of expansive action, as afterward explained.

As already stated, the auxiliary valve-ports 22 and 23 communicate with the main ports. This is effected by the respective passages 29 and 30, the junction being beyond the valves 27 and 28, so as to be uncontrolled by the latter.

The bridle 4 is located between the guides 31, and it may be held in place by springs in place of the bolts shown. The same guides 31 may serve for the auxiliary bridle, if one be fitted.

The lever and gear for operating the auxiliary valve are of the necessary proportions and fitted with the lost motion required. This is shown in Fig. V. The piston-rod 32 of the main piston 33 working in the cylinder 2 has a bracketed collar 34 attached to it. This bracketed collar is provided with a pivoted stud 35, to which is connected the end of the lever 36, fulcrumed at 37. By the reciprocating motion of the piston-rod 32 the lever 36 is caused to oscillate about the fulcrum 37 and the shoulders 38 alternately strike the lock-nuts 39, and so actuate the auxiliary valve 7 through the valve-spindle 9, the requisite amount of lost motion being regulated by setting the lock-nuts 39 nearer to or farther away from the shoulders 38.

The action is as follows: The steam enters by the inlet branch 32, and by the action of the auxiliary valve it is alternately supplied to and exhausted from the valve-cylinders 11 and 11ª through the ports 14 and 15, so as to operate the main valve 6, by which in turn (if the valves 27 and 28 be open) the steam is alternately supplied to and exhausted from the two ends of the main cylinder through the ports 24 and 25. It will also be noted that the auxiliary valve, in addition to distributing steam to the valve-cylinders, also distributes steam to the main cylinder directly through the ports 22 and 23 and the passages 29 and 30 leading to the main ports. If the valves 27 and 28 be shut, the cylinder receives only the steam so distributed directly by the auxiliary valve and the engine acts expansively. On the other hand, when the valves 27 and 28 are fully open the main valve also supplies steam through a large port-opening up to the end of the stroke and the engine does not work expansively. If the valves 27 and 28 be gradually closed, the supply by the main valve is gradually restricted and the action of the engine becomes more and more dependent upon the direct supply by the auxiliary valve, and this latter becomes the sole supply when the valves are quite shut. In this way the adjustment of the valves 27 and 28 by hand regulates the degree of expansive action.

The construction may be modified by arranging both valves to work in the same direction, and although described as applied to vertical single-cylinder-type pumping-engines the invention, with slight modification, is equally applicable to pumping-engines of other types with single or multiple cylinders.

Having now fully described our invention, what we claim, and desire to secure by Letters Patent, is—

1. In a valve-gear for fluid-operated reciprocating motors, the combination with a cylinder having a reciprocating piston, and ports communicating with opposite ends; a casing supplied with the operating fluid; and an exhaust-passage; of an auxiliary valve operated by the movement of the piston and adapted to connect the said ports alternately with the supply-casing and the exhaust-passage, the connection with the supply being cut off before the end of the piston-stroke; a main valve, also adapted to connect the said ports alternately with the supply-casing and the exhaust-passage; and means for controlling the quantity of operating fluid admitted to the cylinder by the main valve, substantially as described.

2. In a valve-gear for fluid-operated reciprocating motors, the combination with a cylinder having a reciprocating piston, and ports communicating with opposite ends; a casing supplied with the operating fluid; and an exhaust-passage; of an auxiliary valve operated by the movement of the piston, and adapted to distribute the operating fluid expansively to the cylinder; a main valve operated by fluid-pressure, controlled by the movement of the auxiliary valve, and adapted to distribute the operating fluid to the cylinder; and means for controlling the quantity of operating fluid admitted to the cylinder by the main valve; substantially as described.

3. In a valve-gear for fluid-operated reciprocating motors, the combination with a cylinder having a reciprocating piston, and ports communicating with opposite ends; a casing supplied with the operating fluid and an exhaust-passage; of a main valve adapted to distribute the operating fluid to the cylinder, and operated by a pair of pistons working fluid-tight in end chambers, and an auxiliary valve adapted to distribute the operating fluid to the cylinder and to the said end chambers; substantially as described and illustrated.

4. In a valve-gear for fluid-operated reciprocating motors, the combination with a cylinder having a reciprocating piston, and ports communicating with opposite ends; a casing supplied with the operating fluid; and an exhaust-passage; of a main valve; pistons and end chambers for operating the latter by fluid-pressure; a bridle adapted to relieve the pressure on the main valve and having a port-face provided with ports leading to the cylinder and to the said end chambers; and an auxiliary valve working on the said port-face operated by the motor-piston and adapted to distribute steam to the cylinder and to the said end chambers substantially as described and illustrated.

5. In a valve-gear for a fluid-operated reciprocating motor, in combination, a main valve, an auxiliary valve, a cylinder having ports communicating with opposite ends thereof, passages connecting the said ports with port-openings controlled by the main valve, passages connecting the said ports with port-openings controlled by the auxiliary valve; and valves in the first-mentioned passages adapted to control the flow therethrough; substantially as described and illustrated.

6. In a valve-gear for fluid-operated reciprocating motors in combination with the main valve, the auxiliary valve, the pistons working in end chambers for operating the former by fluid-pressure, the port-openings controlled by the auxiliary valve, and the passages connecting the said ports to the end chambers; of valves controlling the flow through the said passages, said valves being provided with relatively small by-pass passages which are always open; substantially as described.

In testimony whereof we have hereunto set our hands in the presence of two subscribing witnesses.

HENRY BURNETT WATSON.
TORBEN CHRISTIAN BILLETOP.

Witnesses:
I. W. HESLOP,
F. V. TURNER.